H. H. DOW.
GOVERNING MECHANISM FOR FLUID PRESSURE ENGINES.
APPLICATION FILED AUG. 6, 1904.

976,853.

Patented Nov. 29, 1910.

2 SHEETS—SHEET 1.

WITNESSES:
Fred H. Miller
C. L. Belcher

INVENTOR
Herbert H. Dow
BY
ATTORNEYS

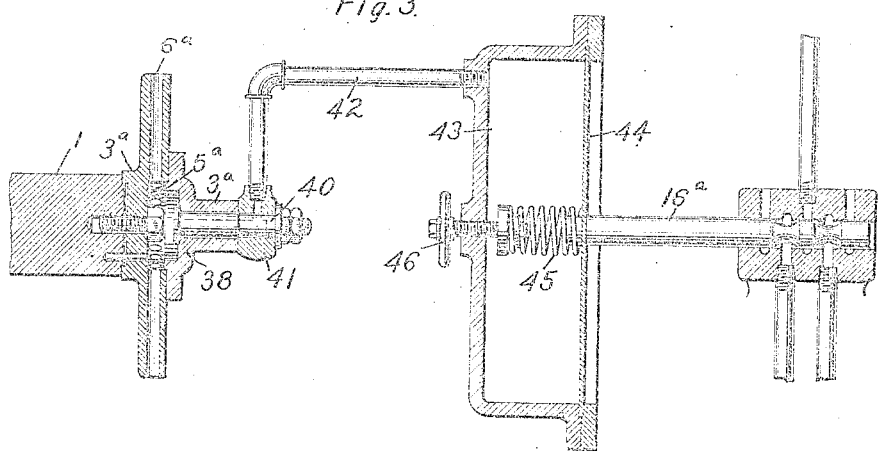
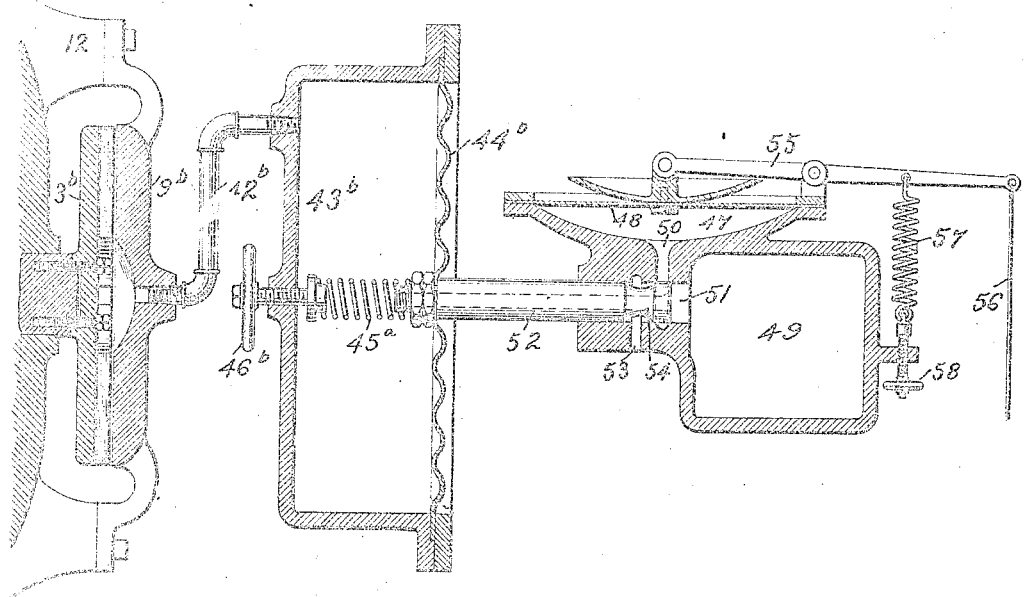

UNITED STATES PATENT OFFICE.

HERBERT H. DOW, OF MIDLAND, MICHIGAN.

GOVERNING MECHANISM FOR FLUID-PRESSURE ENGINES.

976,853.

Specification of Letters Patent.

Patented Nov. 29, 1910.

Application filed August 6, 1904. Serial No. 219,789.

*To all whom it may concern:*

Be it known that I, HERBERT H. DOW, a citizen of the United States, and a resident of Midland, in the county of Midland and State of Michigan, have invented a new and useful Improvement in Governing Mechanism for Fluid-Pressure Engines, of which the following is a specification.

My invention relates to fluid-pressure engines and particularly to means for automatically regulating their speeds by controlling the inlet valve or valves.

The object of my invention is to provide a simple and comparatively inexpensive apparatus which shall be reliable and effective in operation.

My invention was primarily designed for governing steam turbines, and, for convenience of description, I have illustrated it as applied to engines of this character. It is my intention, however, to utilize the invention in connection with any fluid-pressure engine, whether of the rotary or reciprocating type, for which it may be found applicable and in connection with which it may be useful; and I therefore desire it to be understood that any descriptive language employed in the specification which may seem to limit the invention to steam turbines is not to be construed as embodying such limitation.

Figure 1:
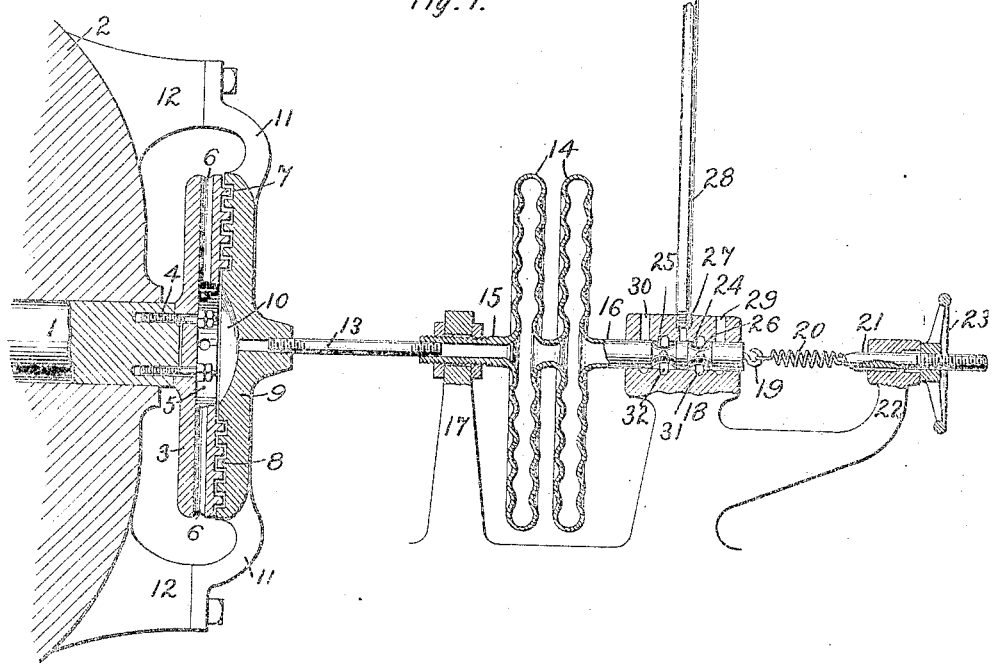
Figure 2:
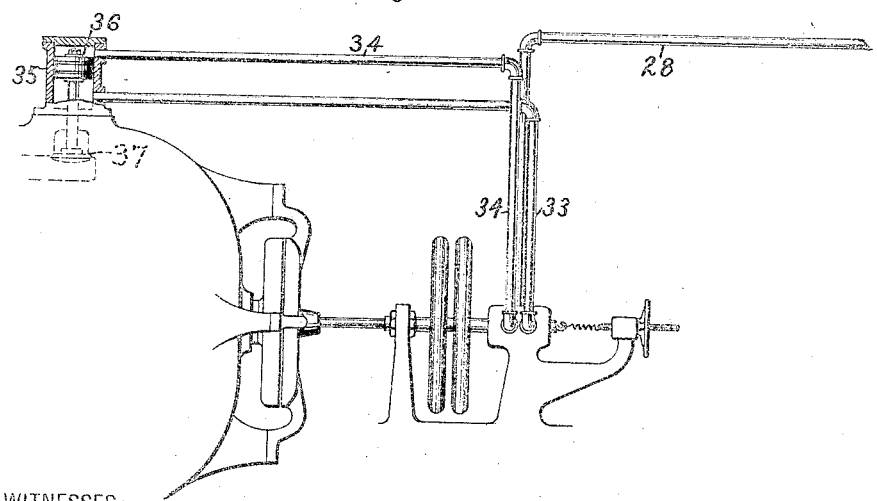

In the drawings, Figure 1 is a sectional view of the preferred form of governing apparatus and a portion of one end of a steam turbine to which the apparatus is applied. Fig. 2 is a view in side elevation of the parts shown in Fig. 1, also showing the connections between the main governing parts and the inlet valve of the turbine. Figs. 3 and 4 are views corresponding to Fig. 1, but illustrating modifications of the governing apparatus.

Referring now particularly to Figs. 1 and 2 of the drawings, the shaft 1 of the turbine 2 is provided, at one end, with a disk 3 which is rigidly fastened to the end of the shaft by means of bolts 4 and is provided with a central recess 5, from which extend outwardly a plurality of radial passages or ducts 6, the outer ends of these passages or ducts terminating in the atmosphere. The outer face of the disk 3 is provided with a plurality of concentric rings 7 which alternate and intermesh with similar rings 8 on a stationary disk 9, which is provided with a central recess 10 to coöperate with the recess 5 in the disk 3 in forming a suitable chamber with which the inner ends of the ducts 6 communicate. The stationary disk 9 is provided with a plurality of arms 11, the free ends of which are bolted or otherwise suitably fastened to bosses 12 which project from the turbine casing. One end of a pipe 13 is connected to the chamber 5—10 and its other end is connected to a pair of hollow disks 14 formed of flexible material and having laterally projecting stems 15 and 16 which are respectively supported in suitable standards 17 and 18 and the latter of which constitutes a piston valve. The surfaces of the disks 14 are shown as of corrugated form, though they may have smooth surfaces, if desired.

The outer end of the stem 16 is provided with a hook 19 which connects with one end of a coil spring 20, the other end of the spring being connected to a rod 21 that has a screw-threaded end and is non-rotatably mounted in an arm 22, so as to be adjusted, by means of a hand-wheel 23, to vary the tension of the spring 20, as may be desired. The stem 16 constitutes a piston valve having two reduced portions 24 and 25. The bearing portion 26 of the standard 18, which constitutes a chamber for the valve 16, is provided with a central port 27, to which is connected a pipe 28 leading from any suitable source of fluid-pressure—such, for example, as the boiler or the main pipe leading therefrom to supply the turbine with steam. The part 26 is also provided with two ports 29 and 30 that open to the atmosphere and with two ports 31 and 32 that are respectively located intermediate the ports 27 and 29 and the ports 29 and 30. Leading from the ports 31 and 32, respectively, are pipes 33 and 34 which extend to a cylinder 35 at opposite sides of a piston 36, which is connected to and controls the operation of the turbine inlet valve 37.

The operation of the invention thus far described is as follows: As the disk 3 is rigidly connected to the engine shaft, it will rotate at the same speed as the shaft and will act in the manner of a centrifugal pump or exhausting device; that is, the air will be forced outward from the passages 6, by centrifugal action, and thus create a partial vacuum in the chamber 5—10. Since the chamber 5—10 is connected to the hollow, flexible disks 14 by the pipe 13 and the stem 15, a partial vacuum will be formed in the disks and, consequently, the flexible sides of the disks will be forced toward each other by atmospheric pressure and the stem 16 will be thus adjusted longitudinally so as to place the port 27 in communication with the port 31 and thus introduce fluid-pressure through the pipe 33 to the cylinder 35 below the piston 36, to close the inlet valve 37. The same adjustment of the stem will obviously place the ports 30 and 32 in communication with each other and therefore permit the space in the cylinder 35 above the cylinder 36 to exhaust to the atmosphere.

The parts may obviously be so adjusted with reference to each other that the slowing-down of the engine to a given low rate of speed will serve to put the port 27 into communication with the port 32 and at the same time put ports 29 and 31 into communication with each other, whereby the fluid-pressure in the pipe 28 will be transmitted through the pipe 34 to the cylinder 35 above the piston 36, and, at the same time, the fluid-pressure in the cylinder 35 below the piston 36 will be exhausted, through the pipe 33 and the corresponding ports, to the atmosphere.

Referring now to Fig. 3, the shaft 1 is provided with a disk $3^a$ having a central recess $5^a$ and radial ducts $6^a$ leading therefrom to the atmosphere, the same as in the construction shown in Fig. 1, but in this case the recess $5^a$ is closed, to form a chamber, by means of a cap 38 that is rigidly connected to the disk $3^a$ and therefore rotates therewith. This cap 38 is provided with a hub 39 which has a bearing upon a hollow rod or tube 40, the latter being provided with a fitting 41 through which connection is made by means of a pipe 42 to a chamber 43 having at one side a flexible wall or diaphragm 44. This diaphragm 44 is connected to a stem $16^a$ which corresponds in structure and functions to the stem 16 of Figs. 1 and 2, and since this device and the various parts which coöperate therewith are the same, both structurally and functionally, as the corresponding parts heretofore described, they are given the same reference characters and the description heretofore given may be read in connection therewith, without the necessity of repetition. The position of the diaphragm 44 and the degree of movement thereof under the action of the partial vacuum produced in the chamber 43 may be regulated by means of a coil spring 45 and a hand-wheel 46, as will be readily understood.

In Fig. 4 the disks $3^b$ and $9^b$ correspond to the parts 3 and 9 of Fig. 1, except that the rings 7 and 8, which constitute packing devices, are omitted. In this modification, the pipe $42^b$ connects, as in Fig. 3, with a chamber $43^b$ having a corrugated, flexible diaphragm $44^b$, a spring $45^b$ and a hand-wheel $46^b$ being provided to operate in the same way and effect the same results as the corresponding parts 45 and 46 in Fig. 3. In this modification, a supplemental chamber 47, having a diaphragm 48, is provided, as is also an air chamber 49, the chambers 47 and 49 having respectively ports or openings 50 and 51 which may be placed in communication with each other or cut off from such communication by means of a tubular valve 52, the outer end of which is connected to the diaphragm $44^b$ of the chamber $43^b$. The cylinder in which the tubular valve 52 operates and of which the port 51 constitutes a part is provided with a port or outlet 53 to the atmosphere, and the reduced portion 54 of the tubular valve serves to put this port 53 into communication with the port or outlet 50 when the valve 52 is moved forwardly from the position shown in the drawing. The diaphragm 48 is connected, by means of a lever 55 and a rod or cord 56, to a balanced inlet valve (not shown).

A regulating spring 57 and an adjusting hand-wheel 58 are provided to adjust the diaphragm 48 and the lever 55, in accordance with the conditions of service. With this construction, it will be understood that when the engine shaft is rotated at high speed a partial vacuum will be created in the chamber $43^b$ and also, through the tubular valve 52, in the chamber 49. The atmospheric pressure upon the diaphragm $44^b$ will serve to move the tubular valve 52 and thus put the chamber 47 into communication with the chambers 49 and $43^b$, and the atmospheric pressure upon the diaphragm 48 will act to move the lever 55 and therefore the inlet valve of the engine to which it is connected, by means of the rod or cord 56.

A decrease in the speed of the engine beyond a given limit will serve to so reduce the degree of vacuum in chamber $43^b$ that the diaphragm $44^b$ will move the tubular valve 52 so as to place the chamber 47 in communication with the atmosphere and thus restore the diaphragm 48 and the parts connected thereto to their normal positions.

Other variations from what is shown may be devised within the scope of my invention, and I therefore desire it to be understood that the invention is not to be restricted, except as limitations may be imposed by the prior art.

I claim as my invention:

1. In a speed governor for fluid-pressure engines, the combination with the engine shaft and a disk mounted thereon and provided with a recess or chamber and with passages or ducts branching outwardly therefrom to the atmosphere, of a chamber having a flexible wall or diaphragm and in communication with said disk chamber, and means governed by the movements of said wall or diaphragm to control the admission of fluid to the engine.

2. The combination, in a fluid pressure engine having a controllable inlet valve, a suction device, comprising a centrifugal pump attached to said engine shaft, a chamber having a flexible wall or diaphragm in communication with said pump and means dependent on the speed of the engine and actuated by said flexible wall or diaphragm for governing the operation of said inlet valve.

3. In combination with a fluid pressure engine a speed governor comprising a centrifugal pump attached to the engine shaft, a chamber having a flexible wall or diaphragm, an air conduit between said pump and said chamber, a valve operated by the movement of said diaphragm and fluid pressure connections governed by said valve to control the fluid supply to said engine in accordance with the speed.

4. In a fluid-pressure engine, the combination with a suction device comprising a centrifugal pump attached to and operated by the engine shaft, of a chamber having a flexible wall or diaphragm, a connection between said suction device and said chamber, a fluid-pressure-actuated inlet valve for the engine and a spring adjusted valve connected to said flexible wall or diaphragm for controlling said fluid-pressure in accordance with the speed of the engine.

5. In a fluid-pressure engine, the combination with a disk having a central recess and radial passages or ducts leading therefrom to the atmosphere and means for fastening said disk to the engine shaft, of a stationary disk adjacent to the first named disk and having a recess coöperating with the central recess in said disk to form a chamber, a chamber having flexible walls one of which is connected to said chamber by a passage, a valve connected to the other flexible wall of said chamber, an inlet valve for the engine having a controlling piston, and fluid-pressure connections to the two sides of said piston which are controlled by the valve which is connected to the said flexible wall or diaphragm.

6. In a fluid-pressure engine, the combination with a disk fastened to the engine shaft and having a central recess and radial passages or ducts leading therefrom to the atmosphere and having a plurality of annular ribs on its outer face, of a stationary disk having a plurality of annular ribs that intermesh with the ribs on the rotating disk, one or more chambers having flexible walls, said chambers being in communication with the chamber formed between the stationary disk and the rotatable disk, an inlet valve for the engine having a governing piston, fluid-pressure connection with the two sides of the piston and a governing valve for said fluid-pressure which is connected to one of the flexible walls or diaphragms and is actuated thereby in accordance with the speed of the engine.

7. In a fluid-pressure engine, the combination with a centrifugal pump operated by the engine shaft, of an adjustable inlet valve for the engine and means intermediate said pump and the inlet valve embodying air chambers and conduits through which the pump acts to adjust the inlet valve to control the engine speed.

8. In combination with a fluid-pressure engine, a speed governor, comprising a pump operated by the engine shaft, a chamber having a flexible wall or diaphragm, an air conduit between said pump and said chamber and means controlled by the fluctuations of said diaphragm for controlling the fluid supply to the engine in accordance with the speed.

9. In combination with a fluid-pressure engine, a speed governor, comprising a pump operated by the engine, a chamber having a flexible wall or diaphragm, an air conduit between said pump and said chamber, a valve operated by the fluctuations of said diaphragm and means operated by said valve for controlling the fluid supply to said engine in accordance with the speed.

10. In combination with a fluid pressure engine, a governing device, comprising a pump, a diaphragm subjected to the action of said pump, a controlling valve operated by the fluctuations of said diaphragm, a supply valve for said engine, a valve operating piston and means dependent on the fluctuations of said diaphragm for operating said controlling valve and opening and closing said supply valve.

11. In combination with a fluid-pressure engine, a governing device, comprising a pump, a chamber having a flexible wall or diaphragm, an air conduit between said pump and said chamber, a pilot valve operated by the fluctuations of said diaphragm, an engine supply valve provided with a valve operating motor and fluid pressure connections governed by said pilot valve for controlling the operation of said supply valve.

12. In combination with a fluid pressure engine, a governing device comprising an exhaust pump operated synchronously with the engine, and an agent subjected to the sucking action of said pump for controlling the supply of motive fluid delivered to said engine.

13. In combination with a pressure engine, a pump operated by the engine shaft, an inlet valve for said engine, an element connected to said valve, means operated by said pump for admitting pressure to either side of said element and for simultaneously exhausting from the other side.

14. In a fluid pressure engine, the combination with a pump operated by the engine shaft, an inlet valve for controlling the delivery of fluid to said engine, an element connected to said valve, means intermediate said pump and said element and operated by the pump for admitting pressure to either side of said element and for exhausting from the other side.

In testimony whereof, I have hereunto subscribed my name this 28 day of June, 1904.

HERBERT H. DOW.

Witnesses:
G. L. CAMP,
J. E. LE FEVRE.